United States Patent [19]
Waxman

[11] Patent Number: 5,668,323
[45] Date of Patent: Sep. 16, 1997

[54] METHOD AND APPARATUS FOR INDICATING A LOAD

[76] Inventor: Cory S. Waxman, 325 E. Hayward, Phoenix, Ariz. 85020

[21] Appl. No.: 679,509

[22] Filed: Jul. 12, 1996

[51] Int. Cl.$^6$ ................................................ G01L 1/00
[52] U.S. Cl. ................................................ 73/761; 411/14
[58] Field of Search .................... 73/761; 116/212, 116/285, DIG. 34; 411/14

[56] References Cited

U.S. PATENT DOCUMENTS

| | | | |
|---|---|---|---|
| 2,995,033 | 8/1961 | Stifano, Jr. | 73/761 |
| 3,943,819 | 3/1976 | Charron | 73/761 |
| 3,954,004 | 5/1976 | Omer | 73/761 |
| 4,934,884 | 6/1990 | Rooke | 411/14 |

FOREIGN PATENT DOCUMENTS

| | | | |
|---|---|---|---|
| 0628884 | 7/1994 | Japan | 73/761 |
| 1742654 | 6/1992 | U.S.S.R. | 73/761 |

Primary Examiner—Richard Chilcot
Assistant Examiner—Ronald Biegel
Attorney, Agent, or Firm—Snell & Wilmer L.L.P.

[57] ABSTRACT

The present invention provides an innovative method and apparatus for determining continuous, visual clamp load status during tightening and throughout the life of a fastener. The present invention provides a nondeformable element (or in some cases elements) that is suitably configured and positioned within a fastener to amplify the deformation of the fastener as a load is applied to the fastener. In accordance with one aspect of the invention, a lever is connected at an internal pivot point of a cartridge. One end of the lever rests upon an abutment within the fastener, while the other end serves as an indicator. As the fastener is tightened, the fastener will elongate causing the abutment to move away form the lever end. As the abutment moves, the lever rotates causing the indicator end to move relative to the visual scale which is calibrated to indicate clamping force. If the fastener loses tension, the fastener will contract, thereby forcing the lever to rotate toward its original position. Assembly and calibration of the device requires the simple, inexpensive process of rotating a cartridge.

20 Claims, 4 Drawing Sheets

METHOD AND APPARATUS FOR INDICATING A LOAD

TECHNICAL FIELD OF THE INVENTION

This invention generally relates to a load indicating fastener, and more particularly, to an apparatus and method for visually representing the tensile strain in a fastener.

BACKGROUND OF THE INVENTION

Fasteners are used in a wide variety of applications, such as motors, railroad tracks, flange assemblies, petrochemical lines, foundations, mills, drag lines, power turbines and studs on cranes and tractors. In many applications, achieving the proper fastener tightness (tension) and maintaining this tightness once the system is placed in service is problematic. As is known in the use of such fasteners, as force is applied to a portion of the fastener, e.g. a head of a bolt or the like, a load is applied to the fastener. As the fastener is tightened, this load increases to a maximum break point i.e. where the fastener breaks or its integrity is otherwise compromised. For various applications, optimal loads are known and/or are obtainable, but currently available methods and apparatus do not adequately enable reliable and repeatable determinations thereof.

Fasteners typically experience a loss of tension when placed in service due to, for example, a variety of in-service occurrences including: relaxation (thread embedment), vibration loosening, compressive deformation in the joint or flange, temperature expansion or contraction, etc. The loss of tension that results from these occurrences can cause premature wear in the assembly, leakage (in applications where the fastener is used for sealing), or catastrophic joint failure due to excessively high loads on other members of the assembly. In certain applications, knowledge of a fastener load (tightness), initially and over time, is desirable for avoiding the potentially dangerous consequences of a loosened fastener, such as slippage, wear, leakage and/or possible failure. In other applications, for example when working with a plurality of bolts around a flange, it is important to evenly tighten the group of bolts. By uniformly tightening a group of bolts or studs to an appropriate load, and maintaining this load over time, potential failures are less likely to be experienced.

An apparatus and method is therefore needed to accurately tighten a fastener and to determine the existing clamp load status. Because current fasteners do not reliably indicate the status of the tension in the fastener, users must often use cumbersome methods to check the tightness of each bolt, or simply re-tighten all of the fasteners regardless of whether such re-tightening is needed. The retorquing (i.e. tightening) of a fastener, however, induces wear and strain in the fastener system from the friction, variations in nut condition, torque values, and the like. Furthermore, the applied torque typically does not expose the bolt to stresses above the elastic range of the fastener, otherwise failure of the fastener may result.

Various load indicating fasteners which analyze and/or utilize the elongation of the tightened fastener to determine the existing clamp load status are known, and such fasteners differ greatly in structure as well as in the methods and apparatuses with which they are used. For example, the analysis of the strain (elongation) existing in the fastener may be conducted through the use of mechanical, electrical, optimechanical, ultrasonic methods and the like. See, for example, U.S. Pat. No. 4,676,109 issued Jun. 30, 1987 to Wallace, U.S. Pat. No. 5,388,463 issued Feb. 14, 1995 to Scott and U.S. Pat. No. 2,600,029 issued Jun. 10, 1952 to Stone each disclosing fasteners including various electronic measurement devices; U.S. Pat. No. 4,899,591 issued Feb. 13, 1990 to Kibblewhite disclosing an ultrasonic load indicating member; and, U.S. Pat. No. 4,823,606 issued Apr. 25, 1989 to Milecki disclosing a diaphragm transducer for sensing load.

Typically, these methods are not usable by ordinary workers. For example, electronic or ultrasonic methods for determining existing clamp load require experienced operators, expensive equipment, clean surfaces and records of pre-installation test values for each bolt or stud. Experienced operators must preform numerous calculations to obtain the clamp load, while compensating for deformations in the head of the fastener. Moreover, devices which require complicated electronics tend to add to the expense, maintenance and unreliability of the system. In addition, such systems may be adversely affected by shock and other extreme conditions.

Some of the prior art devices include reference surfaces or points from which the relative displacements must be measured and analyzed. See, for example, U.S. Pat. No. 4,428,240 issued Jan. 31, 1984 to Schoeps and U.S. Pat. No. 3,561,260 issued Feb. 9, 1971 to Reynolds. These systems generally require skilled labor to use complicated and sophisticated measurement techniques. Moreover, instant visual inspection of the load in a fastener is typically not possible. Additionally, the reference surfaces generally are exposed to the outside environment which often leads to outside forces affecting the system.

Some other of the prior art devices include color indicators which denote the load changes within the fastener by changes in the color of the indicator. See, for example, U.S. Pat. No. 3,987,668 issued Oct. 26, 1976 to Popenoe, U.S. Pat. No. 3,823,639 issued Jul. 16, 1974 to Liber and U.S. Pat. No. 3,964,299 issued Jun. 22, 1976 to Johnson. These indicators require interpretation of the color designation and only indicate when a load exists. Determination of intermediate load levels, or partial loosening of a fastener, is not possible. Furthermore, because most fasteners are in-service in an outdoor environment, variations in sunlight may restrict an inspector's ability to determine the specific color of the indicator.

In general, the present inventor has found that mechanical mechanisms generally provide the most reliable devices for sensing the load in a fastener. For example, UK Patent Number GB 2-265-954-B published May 31, 1995 to Ceney discloses a load indicating fastener with a U-shaped load sensing unit. A first end of the load sensing unit is anchored to the fastener, while the apex of the member sits against an abutment within the fastener. A second end of the load sensing unit acts as an indicator by registering the load on a scale. While this device has some utility in certain applications, over time, the device can become inaccurate and lose calibration. This loss of calibration has been found to be inherent in the design of the U-shaped sensing element, because as the element is continually strained, its calibration characteristics are inherently affected. Thus, after a number of cycles, the U-shaped element may need to be replaced. In addition, temperature may effect the bending characteristics of this U-shaped element. Also, when attempting to match coefficients of linear expansion between the bolt and the U-shaped element, one is limited due to the fact that only a limited number of materials are sufficiently resilient to be used for this design. Deformation of the sensitive U-shaped element also occurs with relatively small amounts of shock.

The bottom of the U is in constant contact with the abutment and any shock will be transferred at the bottom of the U and tend to deform the U-shaped element causing it to lose calibration.

Still other prior art designs use external indicators. For example, the Ceney patent, UK Patent Number GB-2-179-459-A, discloses an externally mounted mechanism for indicating the tightness of a fastener. This system includes a pin in the bore of the fastener that extends out of the end of the fastener, upon extension of the bolt, the pin applies pressure to fulcrumed levers positioned perpendicular to the axis of the bolt. The levers, which are acted upon by a compression spring, are visible through a window in the cover. Due to the design of this system, and the complex arrangement of the levers, and position of the indicator window,the indicator components must be positioned on the outside of the bolt, which in some applications is not possible due to space restrictions. In cases where it is possible to use such a configuration, the elements of the instrument may be susceptible to outside forces and damage. Upon damage, no convenient method exists to verify whether or not the unit is still calibrated.

Because the prior art apparatuses and methods are time consuming, skilled labor intensive, extend outside the fastener, subject to environmental conditions, unreliable, cannot operate at high temperatures and require expensive measuring equipment, a device is needed that, upon tightening of the fastener, indicates the amount of strain from the elongation of the fastener. Thus, a need exists for a tension measuring or indicating device that is simple, easy to manufacture and inexpensive. Moreover, a need exists for a rigid, substantially internal and more durable system which will not experience the aforementioned bending and decalibration problems and which allows accuracy (calibration) to be easily verified in the field.

SUMMARY OF THE INVENTION

The present invention addresses the various long felt but yet unanswered needs created by the prior art devices and methods. While the way in which the present invention addresses these needs will be described in greater detail herein, in general, a nondeformable element (or in some cases elements) is suitably configured and positioned within a fastener to amplify the deformation of the fastener as a load is applied to the fastener.

The present invention provides an innovative method and apparatus for determining continuous, visual clamp load status during tightening and throughout the life of a fastener. In accordance with one aspect of the invention, a lever is connected at an internal pivot point of a cartridge. One end of the lever rests upon an abutment within the fastener, while the other end serves as an indicator. As the fastener is tightened, the fastener will elongate causing the abutment to move away form the lever end. As the abutment moves, the lever rotates causing the indicator end to move relative to the visual scale which is calibrated to indicate clamping force. If the fastener loses tension, the fastener will contract, thereby forcing the lever to rotate toward its original position.

In accordance with further aspects of the invention, assembly and calibration of the device requires the simple, inexpensive process of rotating a cartridge containing, for example, the lever and pivot. In accordance with still other aspects of the present invention, a performance indicator is provided to enable, for example, visual determination of the proper functioning of the device. To avoid wear from harsh conditions, the device can be partially or fully disengaged. To verify that the member is properly calibrated, the device can be partially disengaged and brought back to operating position slowly while observing movement of the indicator.

BRIEF DESCRIPTION OF THE DRAWING FIGURES

Preferred exemplary embodiments of the present invention will hereinafter be described in conjunction with the appended drawing figures, wherein like numerals denote like elements and.

DETAILED DESCRIPTION OF THE PREFERRED EXEMPLARY EMBODIMENT

Figure 1A:
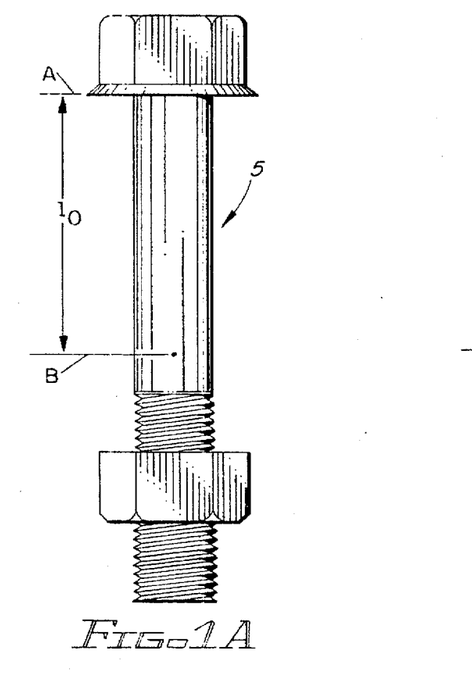
FIG. 1a is an exemplary fastener without an applied load.
Figure 1B:
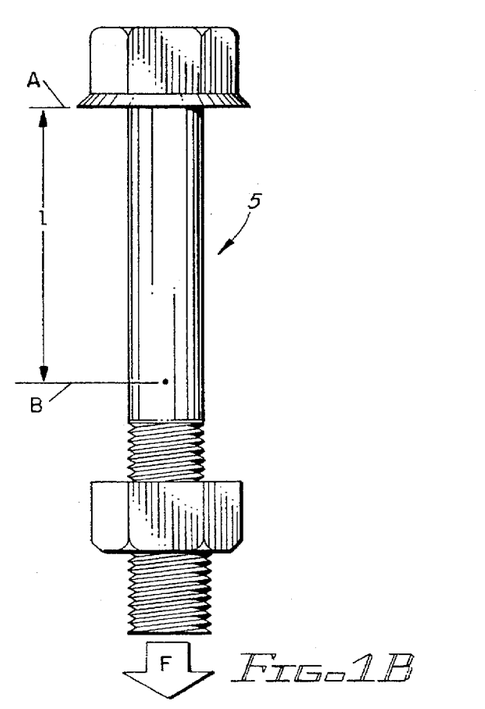
FIG. 1b is an exemplary fastener experiencing an applied load.

With momentary reference to FIGS. 1a and 1b as is appreciated by those skilled in the art, when a force F is applied to a fastener 5, fastener 5 will exhibit an elongation which is proportional to the force (F) applied. The elongation of fastener 5 adheres to Hooke's law, whereby the load is directly proportional to the change in length of fastener 5. For example, in FIG. 1a, an initial distance $l_0$ is defined between a Point A adjacent the bolt head and a Point B located a predetermined distance from Point A on the shank. With reference to FIG. 1b, as a force F is applied, fastener 5 is elongated such that the distance between Points A and B (as shown in FIG. 1b) is greater than $l_0$, namely, as depicted, the distance l between Points A and B. As those skilled in the art will appreciate, $l-l_0=\Delta l$ and $\Delta l$ is proportional to F, where F is the force which is applied to fastener 5.

As will be appreciated, $\Delta l$, will vary depending upon the specific section of fastener 5 which is analyzed. For example, the elongation in the upper portion of the fastener will tend to be different than that in the lower i.e. threaded portion of the fastener. However, within a given region, the percent elongation is substantially constant over that region. As will be described in greater detail hereinbelow, in the context of the present invention the percent elongation over the upper region of the fastener, such as shown in FIGS. 1a and 1b, is utilized in determining the load which is applied to the fastener. The present invention also provides continuous, visual clamp load status during tightening and throughout the life of a fastener, for example fastener 5. It should be appreciated however that other regions of the fastener may be evaluated in certain applications without departing from the scope of the invention.

Figure 1C:
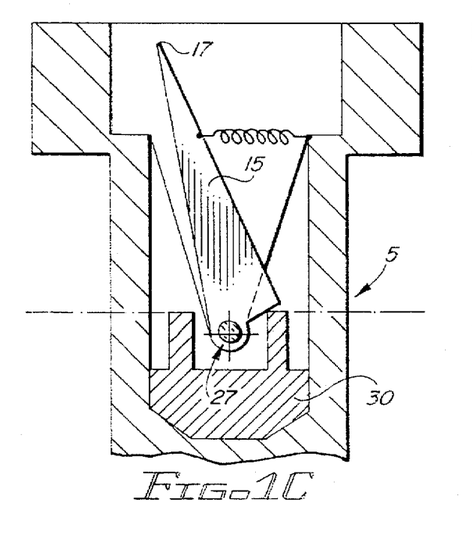
FIG. 1c is a schematic diagram of a cut-away view of a portion of a fastener including a load indicating assembly in accordance with a first embodiment of the present invention.
Figure 1D:
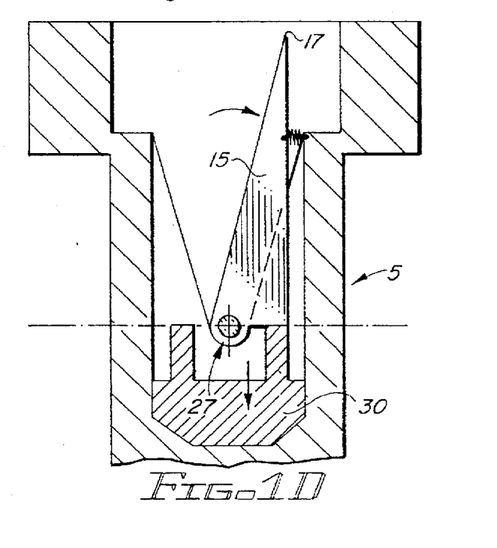
FIG. 1d is a schematic diagram of a cut-away view of a portion of the fastener of FIG. 1c experiencing an applied load.

An apparatus and method according to various aspects of the present invention provides fastener 5 which includes a substantially non-deformable member which is suitably positioned within fastener 5 to amplify the elongation of fastener 5 as a force is applied to fastener 5, such as is shown in FIG. 1d. Fastener 5 is exemplified as a bolt in the drawing figures; however, fastener 5 may comprise any similar securing device capable of elongation in response to an applied force. It should be appreciated that any fastener, for example, stud, pins, dowels and/or the like may incorporate aspects of the present invention and the illustration of fastener 5 as a bolt should not be viewed in any limiting sense.

In accordance with one embodiment of the present invention, as shown in FIG. 1c and 1d, such amplification is enabled by pivoting non-deformable member 15 internally of fastener 5. In accordance with another embodiment of the present invention, such amplification is enabled by the continuous mechanical amplification substantially internally of fastener 5 by the movement of non-deformable member 15. In accordance with certain other embodiments of the present invention, for example as is shown in exemplary FIGS. 2–5, such amplification is enabled by pivoting non-deformable member 15 internally of fastener 5 wherein pivoting non-deformable member 15 is directly or indirectly affixed to fastener 5. In general, in accordance with various aspects of the present invention, a nondeformable member is caused to move when a fastener is elongated. As will be appreciated, in this context the term nondeformable member does not mean that the member is in fact necessarily nondeformable, but rather that the member is substantially not deformed as a result of fastener elongation.

While the member may be of any configuration and positioned suitably to enable such movement, various preferred embodiments of the invention will now be explained.

Figure 2:
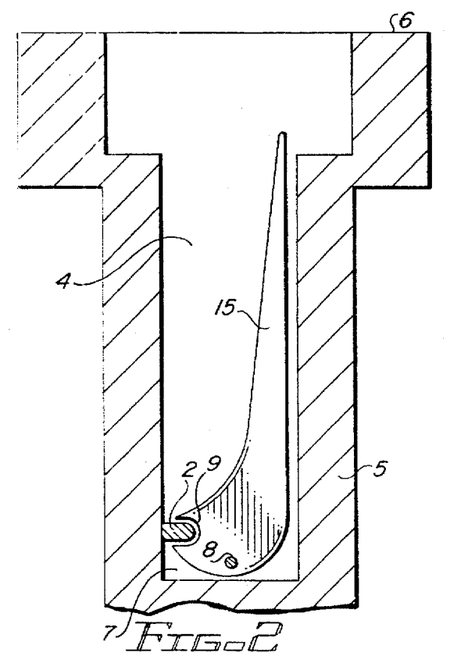
FIG. 2 is a schematic diagram of a cut-away view of a fastener in accordance with a second embodiment of the present invention.
Figure 3:
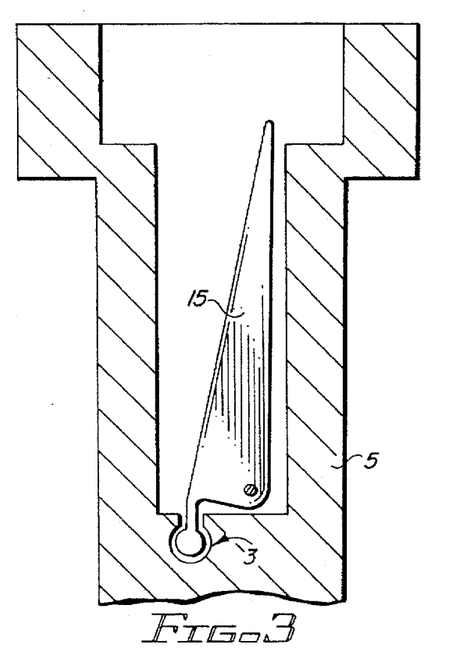
FIG. 3 is a schematic diagram of a cut-away view of an alternative embodiment of a fastener in accordance with the present invention.

With reference to FIG. 2, a schematic diagram shows a cut-away view of one exemplary embodiment of the present invention showing fastener 5 and non-deformable member 15. As shown, fastener 5 includes an elongated, internal bore 4, which preferably extends from the top 6 of fastener 5 to a lower, internal point 7. Member 15 is preferably attached within bore 4 about a pivot 8. A notched section 9 engages peg 2, which in turn effects movement of member 15 upon elongation of fastener 5. With reference to FIG. 3, an exemplary schematic diagram of a cut-away view of an alternative embodiment of the present invention shows fastener 5, non-deformable member 15 and a locking hole 3 whereby a portion of member 15 engages locking hole 3 thus allowing non-deformable member 15 to amplify the elongation of fastener 5.

Figure 4:
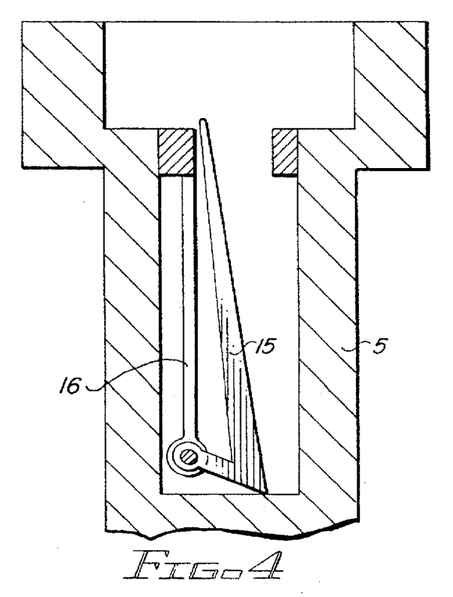
FIG. 4 is a schematic diagram of a cut-away view of another alternative embodiment of a fastener in accordance with the present invention.
Figure 5:
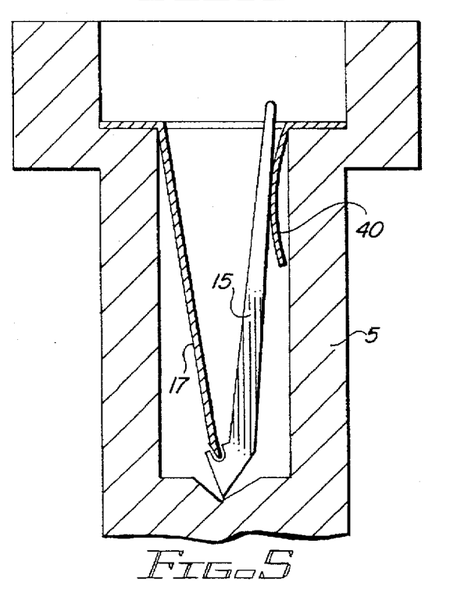
FIG. 5 is a schematic diagram of a cut-away view of still another alternative embodiment of a fastener in accordance with the present invention showing a fastener and abutting non-deformable members.

With reference to FIG. 4, a schematic diagram of a cut-away view of an alternative embodiment of the present invention shows fastener 5 and hinged non-deformable members 15, 16. Non-deformable member 15 rests against an internal surface of fastener 5 thus allowing non-deformable member 15 to amplify the elongation of fastener 15. With reference to FIG. 5, a schematic diagram of a cut-away view of an alternative embodiment of the present invention shows fastener 5, a spring 40, non-deformable member 15 and fulcrum member 17. Non-deformable member 15 rests against an internal surface of fastener 5, while fulcrum member 17 balances non-deformable member 15, thus allowing non-deformable member 15 to amplify the elongation of fastener 15.

Figures 6, 9, 10, 11, 12:
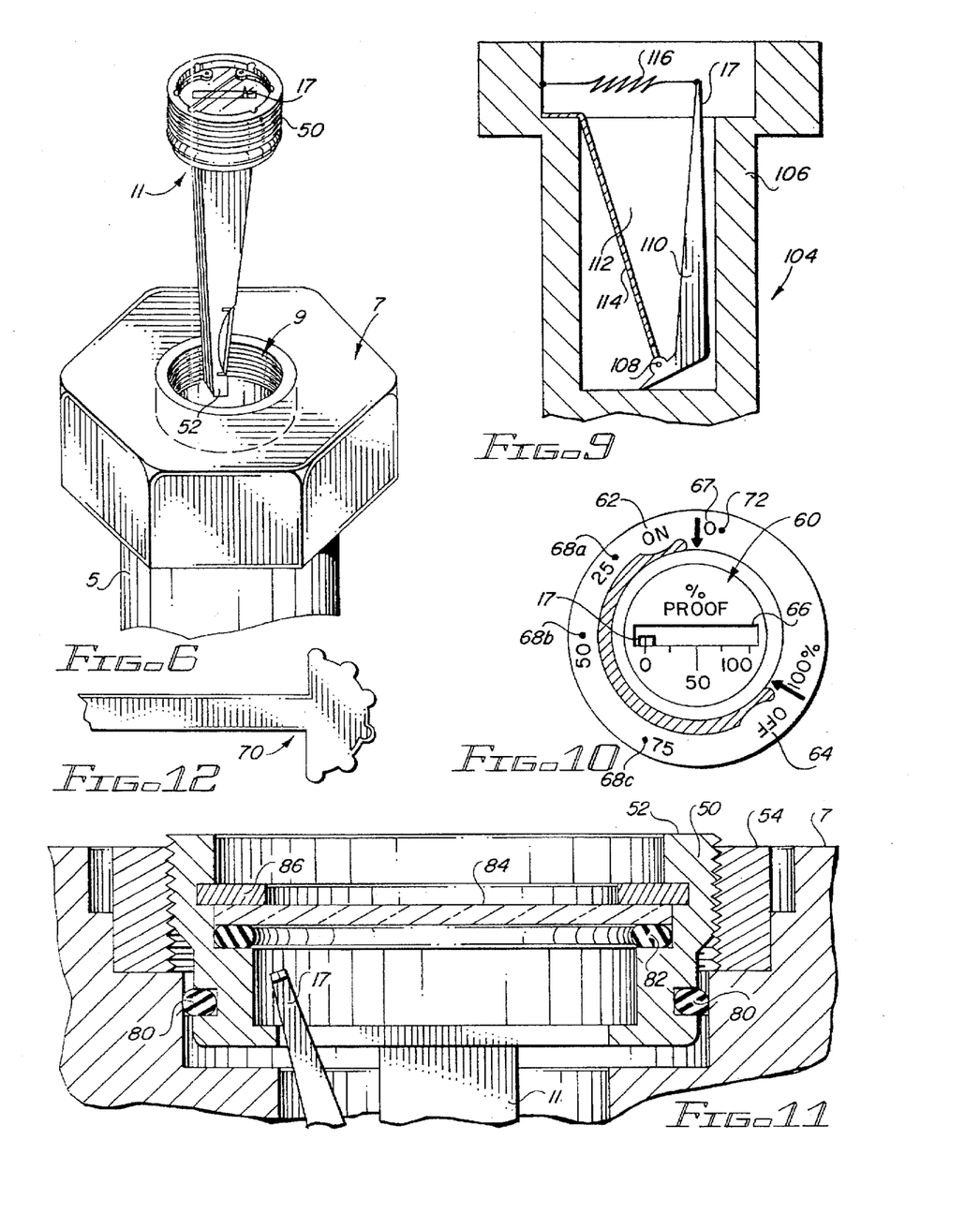
FIG. 6 is a schematic diagram of a fastener in accordance with a further aspect of the invention, wherein the load indication assembly is contained in a cartridge which is inserted into a bore of the fastener.
FIG. 9 is a schematic diagram of a cut-away view of an alternative embodiment of the present invention showing a fastener, non-deformable member, a pivot point and a cartridge.
FIG. 10 is a drawing of an exemplary face of a preferred cartridge useful in accordance with various aspects of the present invention.
FIG. 11 is a cross-sectional view of the bushing/cover components of an exemplary cartridge useful in accordance with fasteners of the present invention.
FIG. 12 is an exemplary fastening key useful in accordance with the present invention.

In accordance with one embodiment of the present invention, with reference to FIGS. 6–9, and specifically to FIG. 6, fastener 5 is provided with a removable, easy to read tension indicating cartridge 11 which continuously reflects clamp load status. While the manner in which the clamp load status of fastener 5 is determined is described in greater detail hereinafter below, in general, with reference to FIG. 7, the stretching of fastener 5 rotates non-deformable member 15. An exemplary apparatus for indicating the clamp load status of a fastener 5 according to various aspects of the present invention comprises a non-deformable member 15, a dowel 27 and a spring 40. As described in greater detail below, and with momentary reference to FIG. 1c and 1d, upon tightening of fastener 5, fastener 5 exerts pressure against datum rod 30 which exerts pressure against non-deformable member 15, thus rotating non-deformable member 15 about dowel 27 while a first end 17 of non-deformable member 15 provides a visual indication of the clamp load in fastener 5.

Figure 7:
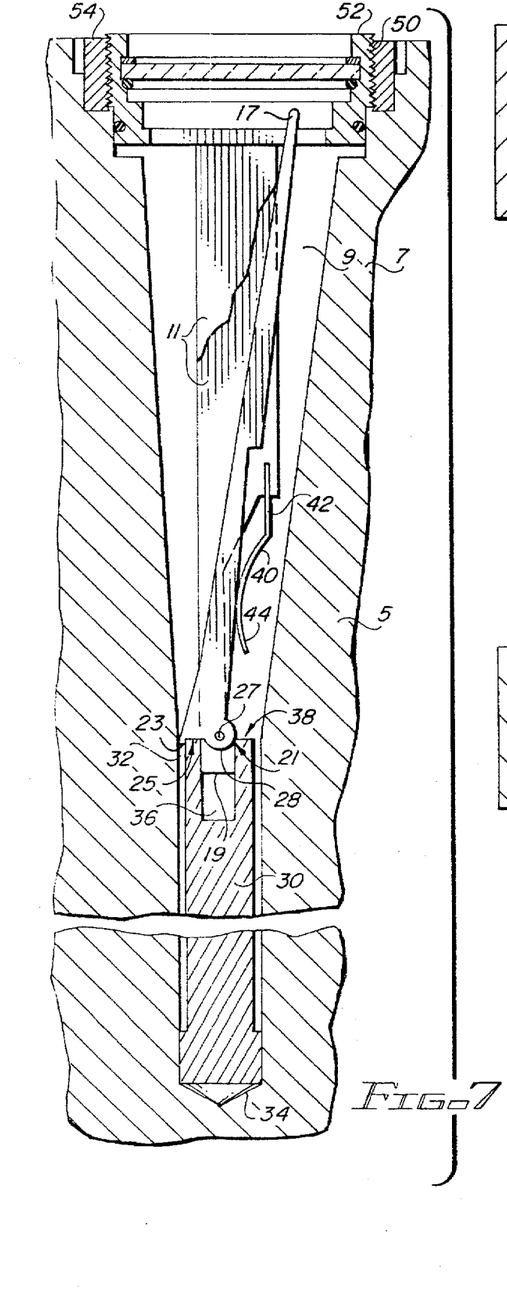
FIG. 7 is a schematic diagram of preferred components of a fastener, of the type shown in FIG. 1c, but with the general load indicating device contained within a cartridge.

With reference to FIG. 7, exemplary non-deformable member 15 suitably comprises any device and configuration capable of responding to stretching of fastener 5 and providing a visual indication of the clamp load in fastener 5. In accordance with a preferred embodiment of this invention, non-deformable member 15 comprises a stainless steel device in a specific configuration. An alternative embodiment of non-deformable member 15 comprises a material which has a similar composition as fastener 5, so as to allow non-deformable member 15 and fastener 5 to embody equal coefficients of expansion. Equal coefficients of expansion are extremely important for fasteners used in high temperature environments to allow uniform expansion and continued accuracy of the device as temperature increases.

With continued reference to FIG. 7, non-deformable member 15 preferably includes a first end 17 and a second end 19, wherein the width of non-deformable member 15 gradually increases from first end 17 to second end 19. First end 17 suitably comprises any device capable of indicating a specific value. With momentary reference to FIGS. 6 and 10, In accordance with a preferred embodiment of this invention, first end 17 comprises a thin stainless steel piece that terminates in a point and forms a 90 degree angle upon exit from cartridge 11. First end 17 points toward the percentage load markings on display 60. Display 60 includes a rectangular slot 66 which allows first end 17 to exit cartridge 11 and allows first end 17 to translate across display 60.

With reference to FIG. 7, second end 19 suitably comprises any surface capable of accepting a force and causing entire non-deformable member 15 to rotate. In accordance with a preferred embodiment of the present invention, a portion of second end 19 comprises a curved first extension 21 emanating from second end 19. First extension 21 suitably contains an opening 28 centered within first extension 21. In the same plane as first extension 21 but on the opposite side of second end 19, second extension 23 suitably emanates from second end 19. However, second extension 23 preferably emanates less than first extension 21, thus allowing first extension 21 to preferably rest within center recessed portion 36 of datum rod 30 while second extension 23 preferably rests upon upper rim 38 of datum rod 30. An inlet 25 is formed between first extension 21 and second extension 23. Inlet 25 avoids contact with upper rim 38 of datum rod 30, thus preventing unwanted wear of datum rod 30.

With continued reference to FIG. 7, exemplary dowel 27 suitably comprises any device capable of forming an internal pivot point for non-deformable member 15. In accordance with a preferred embodiment of the present invention, dowel 27 comprises a stainless steel dowel. In a preferred embodiment, dowel 27 is reciprocally received into opening 28 of non-deformable member 15, while ends of dowel 27 are affixed to cartridge 11. Alternatively, dowel 27 is suitably fixedly attached directly to fastener 5.

With continued reference to FIG. 7, exemplary datum rod 30 suitably comprises any device capable of allowing rotation of non-deformable member 15 and providing a contact point for second extension 23 of non-deformable member 15. In accordance with a preferred embodiment of the present invention, datum rod 30 comprises a stainless steel dowel having a first end 32 and second end 34. First end 32 preferably includes a centered recessed portion 36 surrounded circumferentially by an upper rim 38. Second end 34 is preferably affixed at the bottom of the side walls of bored hole 9 in fastener 5. Attachment of second end 34 of datum rod 30 to fastener 5 is preferably accomplished by press fit. Upon exertion of a clamp load force, the attachment allows datum rod 30 to accurately translate the a desired percentage of the elongation of fastener 5. In an alternative embodiment, an opening of predetermined size can be drilled directly into the center of the bottom of bored hole 9, thereby allowing portions of bored hole 9 of fastener 5 to replicate the above described datum rod configuration. Datum rod 30 or configured bored hole 9 of fastener 5 can be any suitable configuration which provides an accurate translation of the elongation of fastener 5 and allows rotation of non-deformable member 15. In fact, for many alternative embodiments, specifically exemplary FIGS. 2, 3, 4, 8 and 9, a datum rod or a recessed portion at the bottom of bored hole 9 is not even needed. Inlet 25 also allows second extension 23 to be located horizontal to the pivot point at opening 28, thus reducing lateral movement of member 15 and consequently reducing wear on member 15.

With continued reference to FIG. 7, exemplary spring 40 suitably comprises any device capable of providing tension against non-deformable member 15. In accordance with a preferred embodiment of the present invention, spring 40 comprises stainless steel in a hardened condition. Spring 40 has a first end 42 and a second end 44. First end 42 is affixed to cartridge 11, or alternatively, directly to fastener 5. Second end 44 rests upon and provides a force against non-deformable member 15. This force maintains contact between second extension 23 of non-deformable member 15 to apply suitable pressure against upper rim 38 of datum rod 30, or alternatively, pressure against bottom of bored opening 9 of fastener 5. In a preferred embodiment, spring 40 is a return spring only and is not needed for any type of calibration.

With reference to FIG. 6, exemplary cartridge 11 suitably comprises any device capable of supporting dowel 27, allowing rotation of nondeformable member 15 and capable of being installed into fastener head 7. In accordance with a preferred embodiment of the present invention, cartridge 11 comprises stainless steel pieces of sheet metal. Cartridge 11 includes a threaded rounded first end 50 with two parallel rectangular pieces of sheet metal affixed thereto and surrounding non-deformable member 15. In an alternative embodiment, first end 50 suitably includes a rod-and-slot arrangement or a spring-loaded connection, instead of a threaded engagement. First end 17 of non-deformable member 15 extends beyond first end 50 of cartridge 11, while second extension 23 extends beyond second end 52 of cartridge 11. Second end 52 of cartridge 11 preferably includes a rectangular piece of sheet metal which is bent around first extension 21 of non-deformable member 15. In alternative embodiments, cartridge 11 can be any configuration such that cartridge 11 contains non-deformable member 15 and cartridge 11 can be quickly and easily removably installed into fastener head 7.

With reference to FIGS. 10 and 11, in a preferred embodiment, visual display 60 is preferably affixed inside of rounded first end 50 of cartridge 11, such that display 60 can be viewed from top of fastener 5. With reference to FIG. 11, O-ring 80 preferably engages outside of first end 50 of cartridge 11. O-ring 82 preferably engages inside of first end 50 of cartridge 11, thereby supporting transparent cover 84. Transparent cover 84 provides suitable protection for visual display 60. Snap ring 86 preferably engages inside of first end 50 of cartridge 11 above transparent cover 84 to suitably secure attach transparent cover 84 inside first end 50.

With reference to FIG. 10, the percentage markings on display 60 are exemplary markings indicating a proof load below the maximum proof load. Any fraction of this percentage can be used to indicate a fractional proof load. A "0%" exemplary marking 67 indicates some minimum load on fastener 5. A predetermined length of exemplary cartridge 11 will sufficiently respond to any substantially predetermined proof load (rating) below the maximum proof load. Thus, the rating will determine the location of a "100%" designation 66. The markings on display 60 may be any indication of proof load levels, such as colors, letters, symbols and/or the like.

As best shown in FIGS. 6, 7 and 10, before loading cartridge 11 into fastener 5, spring 40 suitably forces first end 17 of non-deformable member 15 to point to a measurement exceeding "100%" designation 66 on display 60. Calibration of cartridge 11 occurs upon insertion of cartridge 11 into fastener head 7, thereby allowing for accuracy and simplification of manufacture. With reference to FIG. 7, upon rotating cartridge 11 into internally threaded bushings 54 of fastener head 55, second extension 23 of non-deformable member 15 suitably compresses against upper rim 38 of datum rod 30, thus moving first end 17 toward "0%" designation 67 on display 60. Cartridge 11 is optimally calibrated upon first end 17 pointing at about "0%" designation 67, thus indicating that no clamp load forces are existing in unloaded fastener 5. In other words, to calibrate cartridge 11, cartridge 11 is simply rotated into threaded head 7 until a "0%" designation 67 is indicated by first end 17 on display 60. With reference to FIG. 12, rotation of cartridge 11 is further assisted by fastening key 70 of any suitable configuration. Fastening key 70 preferably engages the top surface of cartridge 11, thereby allowing leveraged rotation of cartridge 11.

With reference to FIG. 10, incremental markings on display 60 suitably allow an indication of intermediate calibrations of cartridge 11. Suitably engaging cartridge 11 in various lowered positions within fastener 5 enables the verification of the position of non-deformable member 15 relative to display 60. For example, tension (preload) statuses with a 25% designation 68a, a 50% designation 68b, a 75% designation 68c, or any desired load are indicated. The ease of insertion of cartridge 11 into fastener 5 increases the efficiencies for mass production of fastener 5, thus lowering production costs.

Furthermore, the entire cartridge 11, after rotating into head 7 of fastener 5, is preferably flush with head 7 of fastener 5. Internally mounted cartridge 11 is less susceptible to damage by outside forces contacting fastener 5 and enables a device to be used where strict space restrictions prevent the use of an externally mounted system.

Some of the components of cartridge 11 may be subject to wear or deformation during extreme conditions such as vibration and shock. With reference to FIG. 6, the ability to easily rotate cartridge 11 into fastener 5 also allows cartridge 11 to be suitably disengaged by partially rotating cartridge 11 counterclockwise. Disengagement of cartridge 11 preferably avoids any contact between second extension 23 and upper rim 38 of datum rod 30, thus preventing excess wear on second extension 23 during times of extreme conditions and prevents second extension 23 (the sensitive component) to be directly exposed to shock. With reference to FIG. 10, exemplary displays 60 on cartridge 11 surface suitably designate the proper rotational degree required to disengage cartridge 11. The "ON" designation 62 preferably indicates that non-deformable member 15 is in contact with datum rod 30 and in position to measure elongation of fastener 5, or alternatively bottom surface of bored hole 9, while the "OFF" designation 64 preferably indicates non-deformable member 15 is not in contact with datum rod 30, or alternatively bottom surface bored hole 9. For example, the calibration, shock resistant and wear resistant features can be used with the aforementioned Ceney (UK Patent Number GB 2-265-954-B published May 31, 1995) device or any other similar load sensing device.

With continued reference to FIG. 10, a bumper 72 preferably emanates next to "ON" designation 62 on display 60. Bumper 72 prevents fastening key 70, as seen in FIG. 12, from providing excess rotation of cartridge 11 beyond "ON" designation 62 position which could damage non-deformable member 15. Additionally, in the event that upper rim 38 of datum rod 30 or second extension 23 become worn down, the accuracy of calibration for cartridge 11 does not substantially change and only relative "ON" designation 62 and "OFF" designation 64 positions may slightly change.

Figure 13:
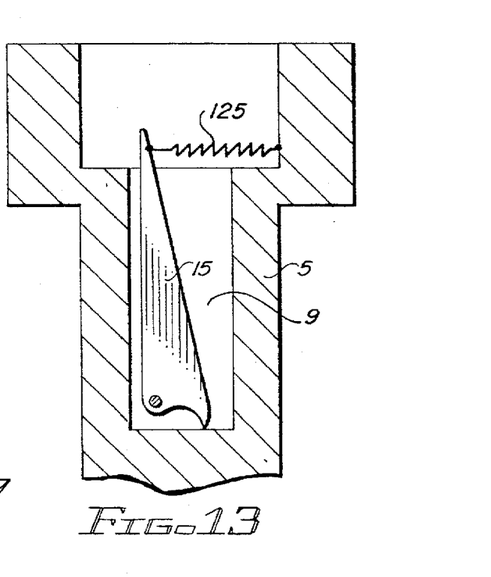
FIG. 13 is a cross-sectional view of an alternative embodiment of the present invention showing a fastener, non-deformable member, a pivot point and a retaining mechanism.

As an alternative embodiment for disengaging member 15, with reference to FIG. 13, a retaining mechanism 125 can restrict member 15 in such a way that member 15 is not in substantial contact with base of bore 9 (or alternatively, substantially avoids contact with the rim of a datum rod).

For example, these shock resistant and wear resistant features can be used with the aforementioned Ceney (UK Patent Number GB 2-265-954-B published May 31, 1995) device or any other similar load sensing device.

Cartridge 11 may also be suitably rotated beyond "OFF" designation 64 and temporarily fully removed from fastener 5 before fastener 5 experiences extreme temperatures or conditions (i.e. thermal radiation associated with power generation and blasts, engine operating temperatures, fire, etc.). Upon cessation of the extreme conditions, cartridge 11 can easily be rotated back into fastener 5 and recalibrated.

With reference to FIG. 6, cartridge 11 can be installed in all of the common fastener grades, including stainless steel and special alloys. As long as the drilled cross-section of bored hole 9 is larger than the smallest stress area (which in bolts is typically in the root of the threads), cartridge 11 will not reduce the proof load capabilities of fastener 5. Fastener 10 is weakest at the point of minimum cross-sectional area, so although fastener 10 contains a bored hole 9, the bored hole 9 does not weaken fastener 10. Additionally, the structure and arrangement of non-deformable member 15 and spring 40 provide rigidity to bored hole 9. By providing rigid cartridge 11, the prior art problems of bending the indicator, and subsequent decalibration, are avoided.

As best shown in FIGS. 1 and 7, as previously discussed, upon tightening of fastener 5 containing cartridge 11, fastener 5 experiences clamp load strain and elongates according to Hooke's Law. The elongation of fastener 5 exerts pressure against datum rod 30. Upper rim 38 of datum rod 30 consequently exerts reduced pressure against second extension 23 of non-deformable member 15, thereby moving first end 17 toward "100%" designation 66 on display 60. Upon loosening of fastener 5, fastener 5 experiences a reduction in clamp load strain and shortens in length. The shortening of fastener 5 increases the pressure against datum rod 30. Upper rim 38 of datum rod 30 consequently increases pressure against second extension 23 of non-deformable member 15, thereby moving first end 17 toward "0%" designation 67 on display 60.

As an alternative embodiment, cartridge 11 can be attached to a pneumatic tightening tool, thereby allowing for auto shut-off before over-tightening. Cartridge 11 can also be attached electronically to a remote sensor for automated monitoring of the clamp load status of a large number of fasteners 5.

Figure 8:
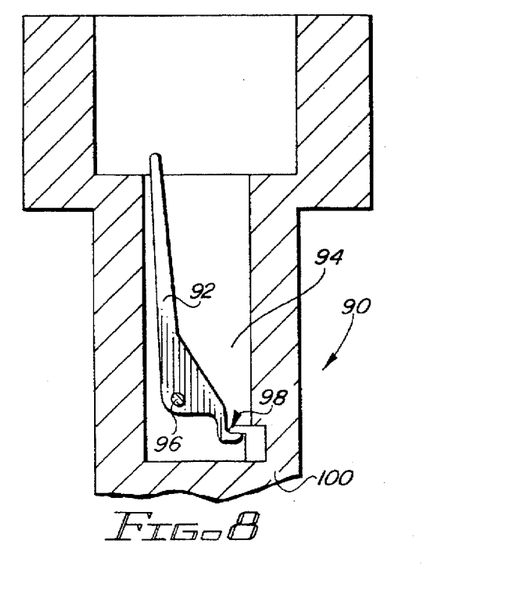
FIG. 8 is a schematic diagram of a cut-away view of an alternative embodiment of the present invention showing a fastener, non-deformable member, a pivot point, a locking device and a cartridge.

In accordance with a further embodiment of the present invention, a fastener system 90 with an internal pivot point 96 is shown with reference to FIG. 8. In accordance with this embodiment, a lever 92 is suitably positioned within a cavity 94 located within fastener 100. As shown, upon elongation of fastener 100, locking inlet 98 causes lever 92 to pivot about a point 96.

In accordance with another embodiment of the present invention, a fastener system 104 with an internal pivot point 108 is shown with reference to FIG. 9. In accordance with this embodiment, a lever 110 is suitably positioned within a cavity 112 located within fastener 106. Lever 110 is held in a fixed position by springs 114,116. As shown, upon elongation of fastener 106, lever 110 pivots about a point 108.

It will be apparent to those skilled in the art, that the foregoing detailed description of a preferred embodiment of the present invention is representative of an apparatus and method for indicating a clamp load within the scope and spirit of the present invention. Further, those skilled in the art will recognize that various changes and modifications may be made without departing from the true spirit and scope of the present invention. For example, spring 40 may suitably be replaced with any configuration capable of providing a recoiling force against non-deformable member 15. Those skilled in the art will recognize that the invention is not limited to the specifics as shown here, but is claimed in any form or modification falling within the scope of the appended claims. For that reason, the scope of the present invention is set forth in the following claims.

I claim:

1. An apparatus for displaying ongoing clamp load comprising, a fastener having an internal bore, a nondeforming member having a pivot point and capable of responding to the elongation of the fastener for displaying the clamp load, wherein said nondeforming member with said pivot point is positioned substantially within said fastener bore.

2. The apparatus of claim 1, wherein said apparatus comprises materials having a same coefficient of thermal expansion.

3. The apparatus of claim 1, further comprising a cartridge for supporting said internal pivot point, thereby allowing rotation of said nondeformable member.

4. The apparatus of claim 3, wherein said cartridge has a mechanism to engage said nondeforming member into said fastener.

5. The apparatus of claim 3, wherein said cartridge has a mechanism to disengage nondeforming member from said fastener.

6. The apparatus of claim 3, wherein said cartridge has a mechanism to partially engage nondeforming member into said fastener.

7. The apparatus of claim 3, wherein said cartridge has a mechanism to partially disengage nondeforming member from said fastener.

8. The apparatus of claim 1, wherein a display indicates degree of rotation of said cartridge required for elimination of contact between said nondeformable member and said fastener.

9. The apparatus of claim 1, wherein said apparatus is entirely enclosed within said fastener.

10. The apparatus of claim 1, wherein said apparatus communicates with a pneumatic tool.

11. The apparatus of claim 1, wherein said apparatus communicates with a remote sensor.

12. A method of displaying ongoing clamp load status of a fastener comprising the steps of, providing a fastener having an internal bore, providing a nondeforming member having a pivot point, positioning said nondeforming member with said pivot point substantially within said fastener bore so that said nondeforming member is capable of responding to, and displaying, the elongation of said fastener.

13. The method of claim 12, wherein said step of providing an internal pivot point comprises providing a cartridge for supporting said internal pivot point wherein said cartridge is entirely enclosed in said fastener.

14. The method of claim 12, further comprising the step of communicating said non-deformable member with a pneumatic tool.

15. The method of claim 12, further comprising the step of communicating said non-deformable member with a remote sensor.

16. A method of displaying ongoing clamp load status comprising the steps of:

providing a nondeforming load indicating device capable of responding to strains of a fastener;

incorporating said load indicating device into a bore of said fastener;

disengaging said load indicating device from the bore of said fastener, thereby avoiding damage to said load indicating device.

17. The method of claim 16, wherein the step of incorporating the device into a fastener further includes engaging said load indicating device into said fastener.

18. The method of claim 16, wherein the step of disengaging the device further includes partially disengaging said load indicating device from said fastener.

19. The method of claim 16, wherein the step of incorporating the device into a fastener further includes partially engaging said apparatus into said fastener.

20. The method of claim 16, wherein the step of incorporating the device into a fastener further includes calibrating said load indicating device, said calibrating step comprises the steps of engaging said load indicating device in various lowering positions, thereby verifying the position of said load indicating device relative to said display.

* * * * *